United States Patent Office 3,462,497
Patented Aug. 19, 1969

3,462,497
RESORCINOL MANUFACTURE
Nicholas P. Greco, Pittsburgh, Pa., assignor to Koppers Company, Inc., a corporation of Delaware
No Drawing. Filed Nov. 14, 1966, Ser. No. 593,711
Int. Cl. C07c 37/10
U.S. Cl. 260—621                                  3 Claims

ABSTRACT OF THE DISCLOSURE

Resorcinol is prepared in high yields and high purity in a one-step process involving the phosphoric acid hydrolysis of meta-phenylenediamine in aqueous solution. The hydrolysis is carried out at temperatures of 170–250° C. and under superatmospheric pressure. After the reaction is completed, the reaction mixture is cooled and the resorcinol is separated therefrom.

---

An attempt to product resorcinol by acid hydrolysis was reported by J. Meyer, Ber. 30, page 2568, (1897) using a 10% aqueous solution of hydrochloric acid and meta-phenylenediamine. Meyer also discusses the use of sulfuric acid and stannous chloride in such a hydrolysis. The teachings of Meyer, however, show that only low yields of resorcinol were obtained in admixture with substantial amounts of tarry, resinous material. In a specific experiment, the yield of resorcinol was about 30%, while still 15% of the starting material had remained unconverted, and the remainder of the reaction mixture was a resinous formation. These low yields and the production of resinous material is not surprising in view of the high reactivity of resorcinol in the presence of both acids or bases in the production of various resins. It is the problem of resin formation which led to the production of resorcinol by various methods other than the hydrolysis of meta-phenylenediamine.

Thus, resorcinol is presently produced in commercial processes by the alkali fusion of benzene sulfonic acid. In such methods, the alkali salts of benzene disulfonic acids are fused with caustic, the melt dissolved in water and acidified with a mineral acid, filtered, and the resorcinol extracted with an organic solvent. Such fusion processes use large amounts of caustic and as a result require vast amounts of mineral acids in order to meet the effluent problem and to spring the caustic salt of the resorcinol.

I have found that, quite surprisingly, high yields of high purity resorcinol can be prepared by the acid hydrolysis of meta-phenylenediamine. My process comprises contacting meta-phenylenediamine with an aqueous solution of phosphoric acid, the amount of phosphoric acid present being sufficient to provide at least 1 mole of hydrolytic hydrogen per mole of meta-phenylenediamine and comprising about 10–40% by weight of the reaction mixture. The reaction mixture of the phosphoric acid and meta-phenylenediamine is heated at a temperature of 170–250° C. for a period of about 3 to 6 hours, whereby resorcinol is produced in a one-step operation and is readily separated from the resulting reaction mass. My process provides an economical route to the valuable product, resorcinol, and virtually eliminates resin formation during the acid hydrolysis.

Because of the high susceptibility of resorcinol to resinification, it is surprising that any acid hydrolysis process could result in a one-step preparation of resorcinol from meta-phenylenediamine without appreciable amounts of resinous material being formed. Resorcinol is known to be susceptible to resinification by strong acids at elevated temperatures. In the presence of such mineral acids, resorcinol polymerizes to polyaryl ethers of various molecular weights.

I have found, however, that ortho-phosphoric acid is unique in its ability to hydrolyze meta-phenylenediamine to resorcinol in high yields and high purity without any significant amounts or resinous formation occurring.

The unique effect of phosphoric acid in my hydrolysis system can be attributed to the effect of the hydrolysis product that is formed in situ during the hydrolysis reaction. As the meta-phenylenediamine is hydrolyzed, there are produced ammonium phosphate salts such as ammonium dihydrogen phosphate or other ammonium phosphates from the reaction of the ammonium produced during hydrolysis, and the phosphoric acid being used for the hydrolysis. These ammonium phosphate salts, soluble in the aqueous hydrolysis medium can provide a buffering effect in the reaction mixture and resulting in the inhibition of resin formation and the prevention of the undesirable degradation of the resorcinol which is being produced. This unique buffering effect of the ammonium phosphate salts, formed in situ during the hydrolysis reaction, is not present when other mineral acids are used in attempting such a hydrolysis. Other mineral acids, for example sulfuric acid or hydrochloric acid have been found to introduce side reactions and to cause resinification of the resorcinol which is being produced. Thus, the use of other mineral acids results in the degradation of the resorcinol produced and the preparation of large amounts of resinous material, even before sufficient conversion of meta-phenylenediamine to give high yields of resorcinol occurs.

The phosphoric acid used in the present process should be present in an amount which is sufficient to provide at least 1 equivalent of hydrolytic hydrogen per mole of meta-phenylenediamine in the reaction mixture. The term hydrolytic hydrogen as used defines the hydrogen which is of sufficient strength to cause the hydrolysis of the meta-phenylenediamine that hydrogen being only the first or primary hydrogen of ortho-phosphoric acid. I have found the second and third hydrogens to be of insufficient acid strength to cause such hydrolysis. The fact that only the first hydrogen atom of phosphoric acid can act as a suitable hydrolytic hydrogen in my process results in the formation, in situ, of hydrogen ammonium phosphate salts which can act as a buffering agent in the reaction mixture for the resorcinol and prevent resinification of either the resorcinol or the starting material, meta-phenylendiamine. As I have noted this unique buffering effect, caused by the formation of hydrogen ammonium salts from the phosphoric acid employed in the hydrolysis of the meta-phenylenediamine, is not present in other acid hydrolysis systems. It is, therefore, possible in the present process to complete the hydrolysis reaction without resinification of the resorcinol initially produced, enabling the preparation of high yields of pure resorcinol.

In addition to use of ortho-phosphoric acid, other phosphoric acids, such as pyrophosphoric or meta-phosphoric acid may be used. These acids, however, are known to hydrolize to ortho-phosphoric acid in aqueous solution such as that used in my process.

The phosphoric acid, added to the reaction mixture should be in an amount sufficient to provide about 10–40% by weight of the resulting reaction mixture. Acid concentrations less than about 10% result in incomplete hydrolysis of the meta-phenylenediamine thereby causing problems in the separation of the resorcinol from the unreacted starting material. Higher concentrations of phosphoric acid may be employed in my process, but the use of such concentrations is impractical because of the heat transfer and product separation problems which would arise.

The reaction mixture, containing the meta-phenylenediamine and phosphoric acid in an amount sufficient to provide at least one hydrolytic hydrogen per mole of meta-phenylenediamine in aqueous solution must be heated to a temperature of about 170–250° C. in order to have sufficient conversion of the meta-phenylenediamine to resorcinol. Temperatures below about 170° C. result in insufficient conversion to resorcinol and therefore pollute the product with starting material, meta-phenylenediamine. If temperatures in excess of about 250° C. are used, there is no specific advantage and the material specifications of the reactor, for example, the use of specific heat and acid-resistant metals or alloys would become necessary.

In order to reach the temperature necessary for suitable conversion, employing an aqueous solution, it is necessary that the reaction be carried out at superatmospheric pressure. Preferably, the vapor pressure of the reactants is used, carrying out the reaction in a closed reactor, but it is possible to employ pressures in excess of the vapor pressure of the reactants if so desired.

Upon heating the reactants to the desired temperature range, they are held at this temperature for about 3–6 hours. The higher the temperature employed, of course, the quicker the conversion and the shorter the necessary reaction time. It should be noted that the use of phosphoric acid at the concentrations and the temperatures desired for the conversion of the meta-phenylenediamine may result in corrosion of the reactor and precautions should be taken, such as the use of a non-corrosive liner, in order to prevent such corrosion from interfering with the desired reaction and thereby causing resin or tar formation through attack upon a metal reactor.

Upon completion of the reaction, the reaction mixture is cooled and the aqueous solution is extracted with an organic solvent to remove the resorcinol product. Various solvents, which sufficiently dissolve resorcinol while being relatively water insoluble themselves are usable in my process, including diethyl ether and the like.

After extraction of the aqueous solution, the organic extract containing the resorcinol product is distilled to remove the solvent and the high purity resorcinol remains. If further purification of the resorcinol is desired a resorcinol mixture may be distilled at reduced pressure to give an even purer product. Should any residual starting material remain which could cause darkening of the resorcinol on standing, the resorcinol can be subjected to an acid wash which removes any residual meta-phenylenediamine and enables the storage of the resorcinol without any decomposition or darkening of the product. Any mineral acid, other than the phosphoric acid employed, in an aqueous solution, such as sulfuric acid or hydrochloric acid is suitable for such a wash to remove possible residual meta-phenylenediamine.

My process, in addition to providing an economical route to resorcinol, results in the preparation of ammonium phosphate salts suitable for use in fertilizer production. Thus, the mineral acid is not wasted during the hydrolysis step, but is converted to another useful product, significantly reducing effluent problems.

My invention is further illustrated by the following:

EXAMPLE I

To a 3 gallon stirring autoclave fitted with a Monel liner, and stirrer, thermocouple and cooling coil of Monel metal, there was charged 450 grams (4.15 moles), of meta-phenylenediamine, 4050 grams of water and 750 grams (6.5 moles), purity 85%, of ortho-phosphoric acid. The solution was homogeneous at room temperature, the phosphoric acid being present in a 12% concentration. The system was purged with nitrogen and heated to 190–200° C. The reaction mixture was maintained at 190–200° C. for 6 hours, the pressure in the autoclave being 230 p.s.i. Upon cooling of the homogeneous product, the aqueous solution was extracted three times with 3 liters of diethyl ether. The ether was distilled to give pale yellow crystals of crude resorcinol, 440 grams. After drying the resorcinol under vacuum on a steam bath, the resorcinol was flash distilled at reduced pressure to give 395 grams of resorcinol, boiling point 130–141.8° C. at 5 millimeters pressure. The white resorcinol, corresponding to an 86% yield, had a melting point of 109.5–110° C.

EXAMPLE II

To an autoclave there was charged 50 grams (0.46 moles) of meta-phenylenediamine, 600 grams of water and 253 grams of 85% ortho-phosphoric acid (2.2 moles). The pH of the solution was 1.3, the phosphoric acid present in a 24% concentration. The autoclave was purged with nitrogen and heated with shaking to 180° C. The reaction mixture was held at 180° C. for 4½ hours. The reaction product was then cooled and filtered to remove 5 grams of resinous material, and the filtrate, having a dark color, was extracted with two 500 milliliter portions of diethyl ether. After drying, concentration of the ether extracts gave 45 grams of pale yellow resorcinol corresponding to a 90% yield. The aqueous filtrate was analyzed and contained inorganic ammonium phosphate salts.

EXAMPLE III

An attempt was made to hydrolyze meta-phenylenediamine to resorcinol with sulfuric acid. To an autoclave was charged 450 grams of meta-phenylenediamine (4.13 moles), 5,000 grams of water and 945 grams of 96% sulfuric acid (9.25 moles). The resulting reaction mixture contained sulfuric acid in about a 14% concentration. The autoclave was purged with nitrogen and heated to 180° C. After 2.5 hours at 180–190° C., the reaction was stopped and the product was a resinous mass from which no resorcinol could be extracted.

EXAMPLE IV

To a sealed reactor, there was charged 25 grams (0.23 mole) of meta-phenylenediamine, 225 grams of water and concentrated hydrochloric acid (0.75 mole). The reactor was shaken and heated at 190° C. for 6 hours. The resulting product contained only an 18% yield of difficulty separable resorcinol, with the residue being starting material and primarily a resinous material.

EXAMPLE V

An attempt was made to produce resorcinol by the vapor phase hydrolysis of meta-phenylenediamine over silica-aluminum catalyst. The temperature employed was 230° C. The resinous product contained only a trace of resorcinol. Thus, the uniqueness of phosphoric acid in the hydorlysis of meta-phenylenediamine is further illustrated.

EXAMPLE VI

Technical meta-phenylenediamine (25 g.) was dissolved in 250 ml. of water and 85% phosphoric acid 127 g. (75 mole) was added gradually until a pH of 1.3 was reached. The dark solution was placed in a glass liner containing a small pin hole opening for pressure equalization and inserted in a 2.2 liter shaker autoclave. About 200 ml. of water was placed outside the liner. The system was purged with nitrogen to expel any oxygen present. The reactor was heated to 180° C. and held for four hours. The product was homogeneous. The straw-colored solution was extracted with ether (2× 250 ml.). The water-white ether extract on evaporation gave 24 g. (96%) of resorcinol, dried to constant weight on a steam bath, (M.P. 106° C.). Identification by infrared showed the absence of amino groups.

I claim:

1. In the process for the production of resorcinol by the acid hydrolysis of meta-phenylenediamine, the improvement comprising:

(a) contacting meta-phenylenediamine with phosphoric acid, said phosphoric acid being present in an amount sufficient to provide at least one hydrolytic hydrogen per mole of said meta-phenylenediamine, in the form of an aqueous reaction mixture having a pH at or below 1.3, said phosphoric acid comprising 10–40% of said reaction mixture;

(b) heating said reaction mixture at a temperature of 170–250° C. at superatmospheric pressure and maintaining said reaction mixture at said temperature for about three to six hours to convert meta-phenylenediamine to resorcinol;

(c) cooling the reaction mixture; and (d) separating resorcinal therefrom by extraction with an organic solvent, said solvent being relatively water insoluble but serving to dissolve said resorcinol.

2. The process of claim 1 wherein said separated resorcinol is subjected to a mineral acid wash.

3. In a process for the production of resorcinol by the acid hydrolysis of meta-phenylenediamine the improvement comprising:

(a) contacting the meta-phenylenediamine with an aqueous solution of ortho-phosphoric acid, said ortho-phosphoric acid being present in an amount sufficient to provide at least one equivalent of hydrolytic hydrogen per mole of meta-phenylenediamine, to form a reaction mixture having a pH at or below 1.3, said ortho-phosphoric acid comprising 10–40% by weight of said reaction mixture;

(b) heating said reaction mixture to a temperature of 170–250° C. at superatmospheric pressure;

(c) maintaining said reaction mixture at said temperature for about three to six hours to convert meta-phenylenediamine to resorcinol;

(d) cooling the reaction mixture;

(e) separating resorcinol therefrom by extraction with an organic solvent, said solvent being relatively water insoluble but serving to dissolve said resorcinol;

(f) washing said resorcinol with an aqueous acidic solution containing a mineral acid selected from the group consisting of sulfuric acid and hydrochloric acid.

References Cited

UNITED STATES PATENTS 2,273,030   2/1942   Fitzky et al.

OTHER REFERENCES

Meyer, Berichte 30, pp. 2568–9 (1897).

BERNARD HELFIN, Primary Examiner

N. MORGENSTERN, Assistant Examiner

United States Patent Office 3,462,498
Patented Aug. 19, 1969

3,462,498
PROCESS FOR ISOLATION OF 2,5-DICHLORO-
PHENOL FROM AN ISOMERIC MIXTURE OF
DICHLOROPHENOLS
Wilfrit Lowe, Ingelheim am Rhein, Germany, assignor to C. H. Boehringer Sohn, Ingelheim am Rhein, Germany, a limited-partnership of Germany
No Drawing. Filed Aug. 31, 1966, Ser. No. 576,245
Claims priority, application Germany, Sept. 10, 1965, B 83,681
Int. Cl. C07c 39/30
U.S. Cl. 260—623    3 Claims

ABSTRACT OF THE DISCLOSURE

A process for isolating 2,5-dichlorophenol from a mixture consisting essentially of 2,4- and 2,5- or 2,4-, 2,5- and 3,4-dichlorophenol is disclosed, which comprises heating said mixture to a temperature above 85° C. and below the decomposition temperature of urea, together with an amount of urea corresponding to at least one mol-equivalent based on the 2,5- and 3,4-dichlorophenol content of said mixture and no more than two mol-equivalents based on the total number of mols of dichlorophenol isomers contained in said mixture, to form a 2,5-dichlorophenol-urea adduct or a mixture of 2,5- and 3,4-dichlorophenol-urea adducts, respectively, cooling the reaction mixture to the temperature at which the crystallization of the 2,5-dichlorophenol-urea adduct begins, adding an inert organic solvent having a boiling point substantially above 85° C. to prevent the 2,4-dichlorophenol-urea adduct from precipitating out and allowing the mixture to cool to room temperature, separating the precipitated dichlorophenol-urea adducts and hydrolyzing them by heating them with water to a temperature of about 70 to 80° C., and recovering 2,5-dichlorophenol from the hydrolyzate.

---

This invention relates to a process whereby 2,5-dichlorophenol may be isolated from a mixture consisting of at least 2,4- and 2,5-dichlorophenol isomers.

2,5-dichlorophenol has acquired significant importance as a starting material for the preparation of insecticides and other pest control agents, but no economically feasible method has been devised for isolating this important compound in substantially pure form from one of its cheapest sources.

A mixture of dichlorophenol isomers may be easily and relatively inexpensively obtained by alkaline hydrolysis under pressure of 1,2,4-trichlorobenzene, which itself is readily accessible by the method described in Beilstein V, 204, for instance. The alkaline hydrolysis yields a mixture consisting essentially of 2,4-, 2,5- and 3,4-dichlorophenol isomers (see U.S. Patent 2,799,714 and C.A. 52, 2070/71). The 3,4-dichlorophenol isomer may easily be separated from the other isomers by distillation, making use of the relatively large difference between the boiling points of the 3,4-isomer (B.P. 130–132° C. at 12 mm. Hg) on the one hand and the 2,4- and 2,5-isomers (B.P. of both 90° C. at 12 mm. Hg) on the other hand. However, no industrially acceptable process for separation of the remaining 2,4- and 2,5-isomer mixture has heretofore been known.

The primary object of the present invention, therefore, is to provide a process for effectively separating 2,5-dichlorophenol from a mixture consisting essentially of 2,5-dichlorophenol and 2,4-dichlorophenol by economically feasible and industrially acceptable means.

A further object of the invention is to provide a process for virtually quantitative separation of 2,5-dichlorophenol from its 2,4-isomer.

Another object of the instant invention is to provide a process for recovery of 2,5-dichlorophenol, free from other dichlorophenol isomers, from a mixture consisting essentially of 2,5-dichlorophenol and its 2,4-isomer, or of 2,5-, 2,4- and 3,4-dichlorophenol.

Other objects and advantages of the present invention will become apparent as the description thereof proceeds.

The above objects are attained in accordance with the instant invention by virtue of the surprising discovery that the separation may effectively and economically be achieved by way of the urea-adducts of the dichlorophenol isomers.

More particularly, I have discovered that the isomer separation may be achieved by melting an isomeric mixture consisting essentially of 2,4- and 2,5-dichlorophenol and heating it to a temperature above 85° C. but below the decomposition temperature of the urea, admixing the molten mixture with urea in an amount of at least one mol equivalent based on the number of mols of 2,5-dichlorophenol in the isomeric mixture and no more than two mol equivalents based on the total number of mols of dichlorophenol isomers in the isomeric mixture, preferably from 1 to 1.5 mol equivalents of urea based on the total number of mols of dichlorophenol isomers in the isomeric mixture, and allowing the resulting urea-dichlorophenol adduct mixture to cool. When the adduct mixture reaches a temperature of about 105° C. in the course of cooling, only the 2,5-dichlorophenol-urea adduct crystallizes out, whereas the 2,4 - dichlorophenol-urea adduct does not begin to precipitate out until the temperature of the adduct mixture reaches about 85° C.

Actually, it is immaterial whether the urea is added to the isomeric dichlorophenol mixture before or after the latter is heated; in other words, the urea may be added first and the resulting mixture may thereafter be melted and heated to the required temperature as set forth above.

The precipitation of the 2,4-dichlorophenol-urea adduct beginning at about 85° C. may be altogether prevented by cooling the mixture before and after it reaches 85° C., in the presence of an inert organic solvent having a boiling point substantially above 85° C. and preferably above 105° C., such as toluene, ligroin (petroleum ethers of medium boiling point range) or a xylene. The 2,4-dichlorophenol thereby remains in solution while the 2,5-dichlorophenol-urea adduct remains undissolved.

Again, it is immaterial at what point in the process the solvent is added, so long as it is present just before and continuously after the cooling mixture passes the critical temperature of 85° C. Thus, the solvent may be added together with the urea, or the solvent may be added first and the urea later.

Another very advantageous embodiment of the process according to the present invention comprises adding only one molar equivalent of urea based on the number of mols of 2,5-dichlorophenol in the isomeric dichlorophenol mixture. Under these conditions only the 2,5-isomer forms a urea adduct, so that the inert organic solvent needed for extraction of the 2,4-dichlorophenol may be added after the urea adduct mixture has passed 85° C. in the course of cooling.

The amount of 2,5-dichlorophenol in the isomeric mixture consisting essentially of 2,5-dichlorophenol and its 2,4-isomer may easily be determined by a number of different known methods, such as by gas chromatography.

The formation of the urea adducts proceeds practically quantitatively. In those instances where the separation is carried out in the presence of an inert organic solvent, however, a minor portion of the 2,5-dichlorophenol-urea adduct goes into solution in the solvent, so that upon